US012789711B2

(12) United States Patent
Harmon et al.

(10) Patent No.: US 12,789,711 B2
(45) Date of Patent: Nov. 10, 2026

(54) VEHICLE SEATING ASSEMBLY HAVING UNDER STORAGE COMPARTMENT WITH SLIDING DRAWER AND STEP

(71) Applicant: Ford Global Technologies, LLC, Dearborn, MI (US)

(72) Inventors: Michael John Harmon, Northville, MI (US); Martin Delonis, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 18/350,301

(22) Filed: Jul. 11, 2023

(65) Prior Publication Data

US 2025/0018870 A1 Jan. 16, 2025

(51) Int. Cl.

*B60R 7/04* (2006.01)
*B60N 2/30* (2006.01)
*B60R 3/02* (2006.01)

(52) U.S. Cl.

CPC ............ *B60R 7/043* (2013.01); *B60N 2/3047* (2013.01); *B60R 3/02* (2013.01)

(58) Field of Classification Search

CPC . B60R 7/043; B60R 11/06; B60R 2011/0012; B60R 3/00; B60R 3/02; B60N 2/3047

USPC .................................. 296/37.15; 297/188.08

See application file for complete search history.

(56) References Cited

U.S. PATENT DOCUMENTS

| | | | | |
|---|---|---|---|---|
| 4,635,992 A * | 1/1987 | Hamilton | B60R 9/00 | 312/902 |
| 6,161,896 A * | 12/2000 | Johnson | B60R 7/043 | 297/188.1 |
| 7,318,616 B1 * | 1/2008 | Bradley | B60N 2/206 | 296/37.15 |
| 7,611,183 B2 | 11/2009 | Burkey et al. | | |
| 9,944,232 B2 | 4/2018 | Peregrina Loera et al. | | |
| 9,950,674 B1 | 4/2018 | Kalergis et al. | | |
| 10,343,562 B2 | 7/2019 | Dry et al. | | |
| 10,926,708 B2 | 2/2021 | Gill et al. | | |
| 11,351,921 B2 * | 6/2022 | Ortiz | B60R 3/02 | |
| 2002/0005649 A1 * | 1/2002 | Hofmann | B60N 2/305 | 297/188.1 |
| 2013/0087590 A1 * | 4/2013 | Lee | B60R 5/04 | 224/496 |
| 2018/0111561 A1 * | 4/2018 | Kalergis | B60N 2/305 | |
| 2018/0228118 A1 * | 8/2018 | Murray | A01K 1/0272 | |
| 2022/0161855 A1 * | 5/2022 | Tatsuwaki | B62D 21/157 | |
| 2022/0289312 A1 * | 9/2022 | Aquila | B62D 25/105 | |

FOREIGN PATENT DOCUMENTS

EP 2532569 A1 * 12/2012 ........... A47B 88/944

* cited by examiner

*Primary Examiner* — Wenwei Zhuo

(74) *Attorney, Agent, or Firm* — Vichit Chea; Price Heneveld LLP

(57) ABSTRACT

A vehicle seating assembly comprising a seat back, a seat base that is pivotable between a raised position and a lowered seating position, a storage compartment located under the seat when the seat is in the lowered seating position, and a first drawer slidably disposed within the storage compartment and accessible via a first lateral side of the vehicle seating assembly, where the first drawer includes a first step surface on a top side thereof configured to support a user when the first drawer is in an open position.

20 Claims, 11 Drawing Sheets

VEHICLE SEATING ASSEMBLY HAVING UNDER STORAGE COMPARTMENT WITH SLIDING DRAWER AND STEP

FIELD OF THE DISCLOSURE

The present disclosure generally relates to vehicle seating and storage, and more particularly relates to a vehicle seating assembly having an under seat storage compartment with side drawer access.

BACKGROUND OF THE DISCLOSURE

Motor vehicles are commonly equipped with vehicle seating assemblies that may include storage compartments. For example, a rear row of seating in a motor vehicle may include a seat that covers an under storage compartment such as may be found on a pick-up truck. It would be desirable to provide for a vehicle seating assembly having an under seat storage compartment that allows for easy access to the storage compartment and access to other parts of the vehicle.

SUMMARY OF THE DISCLOSURE

According to a first aspect of the present disclosure, a vehicle seating assembly comprises a seat back, a seat base that is pivotable between a raised position and a lowered seating position, a storage compartment located under the seat when the seat is in the lowered seating position, and a first drawer slidably disposed within the storage compartment and accessible via a first lateral side of the vehicle seating assembly, where the first drawer includes a first step surface on a top side thereof configured to support a user when the first drawer is in an open position.

Embodiments of the first aspect of the present disclosure can include any one or a combination of the following features:

- the storage compartment comprises a seat support for supporting the seat and seat back;
- the seat support is configured to be supported on top of a vehicle floor;
- the first drawer is disposed within a recessed portion of the floor;
- the vehicle floor comprises at least one battery pack;
- the first drawer is located on a first lateral side and the seating assembly further comprises a second drawer located on a second lateral side, where the second drawer includes a second step surface configured to support a user when the second drawer is in an open position;
- the first drawer comprises first and second rails configured to engage a plurality of rollers;
- the first drawer comprises a lock mechanism;
- the lock mechanism engages slots in the pair of rails in a locked position; and
- the vehicle seating assembly is a second row seating assembly in a pick-up truck.

According to a second aspect of the present disclosure, a vehicle comprises a cabin interior, a floor defining a bottom side of the cabin interior, a vehicle seating assembly, a seat back, a seat base that is pivotable between a raised position and a lowered seating position, a storage compartment located under the seat when the seat is in the lowered seating position, and at least one drawer slidably disposed within the storage compartment and accessible via a lateral side of the vehicle seating assembly, wherein the at least one drawer includes a stepped surface on a top side thereof configured to support a user when the drawer is in an open position.

Embodiments of the second aspect of the present disclosure can include any one or a combination of the following features:

- the storage compartment comprises a seat support for supporting the seat and seat back;
- the seat support is configured to be supported on top of a vehicle floor;
- the first drawer is disposed within a recessed portion of the floor;
- the vehicle floor comprises at least one battery pack;
- the first drawer is located on a first lateral side and further comprises a second drawer located on a second lateral side, where the second drawer includes a second step surface configured to support a user when the second drawer is in an open position;
- the first drawer comprises a pair of rails configured to engage a plurality of rollers;
- the first drawer comprises a lock mechanism;
- the lock mechanism engages slots in the pair of rails in a locked position; and
- the vehicle seating assembly is a second row seating assembly in a pick-up truck.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
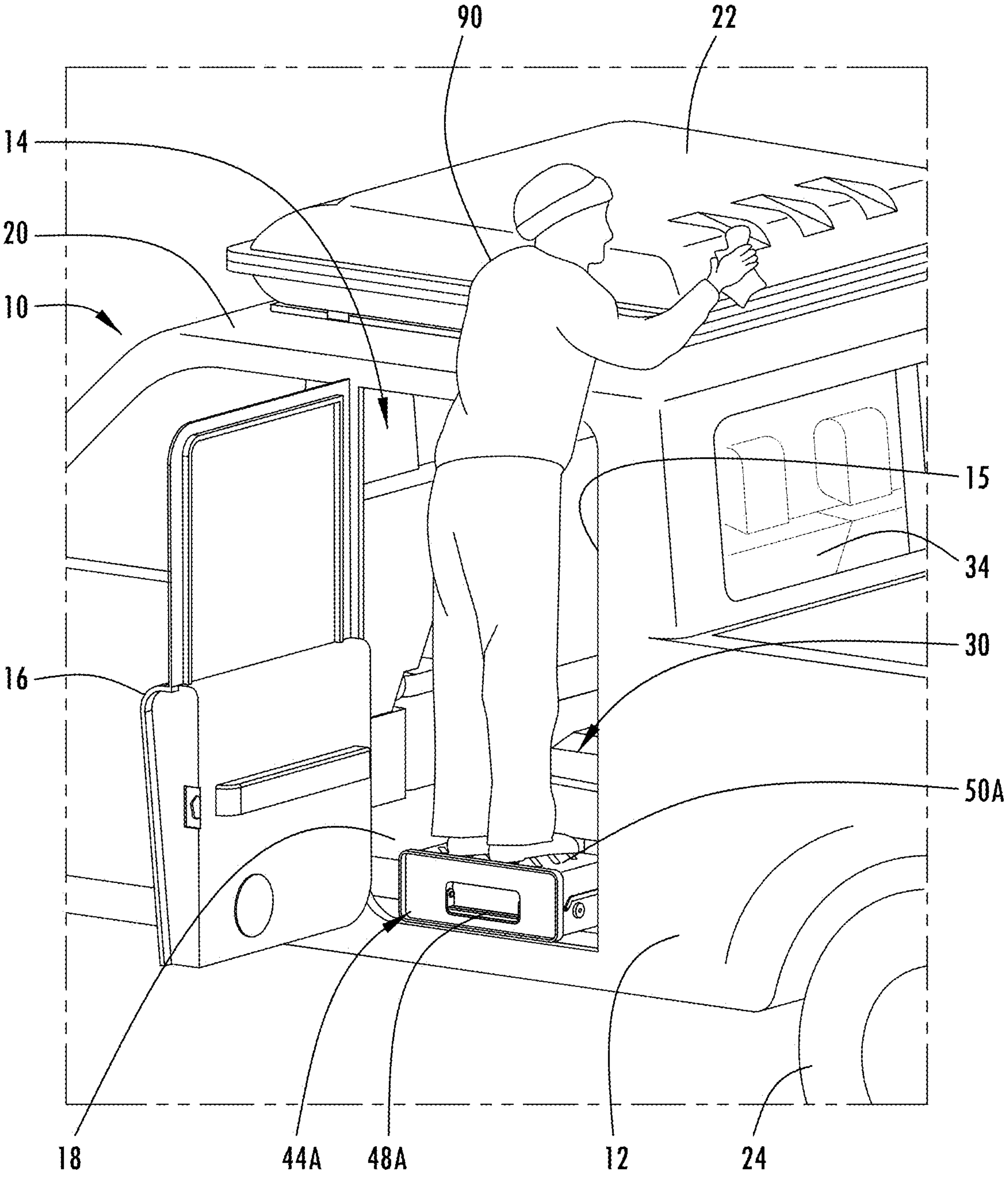
FIG. 1 is a side perspective view of a motor vehicle having a vehicle seating assembly with a first drawer in an open step position exposing a step for a user.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right." "left," "rear." "front." "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly having an under seat storage compartment and a step surface. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about." and one not modified by "about." It will be further understood that the end-points of each of the ranges are significant both in relation to the other end-point, and independently of the other end-point.

The terms "substantial," "substantially." and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-11, a wheeled automotive or motor vehicle 10 is generally illustrated configured with passenger seating for transporting one or more passengers including a driver of a vehicle 10 and one or more items onboard the vehicle 10. The motor vehicle 10 has a vehicle body 12 that generally defines a cabin interior 14 that may contain various features and components. The cabin interior 14 has an arrangement of a front row of passenger seats which typically are configured to seat a driver and a passenger and a rear vehicle seating assembly 30 generally positioned rearward of the front row of seating assemblies and supported on a floor 18. The vehicle seating assembly 30 is a stowable vehicle seating assembly that may have a seat that may flip upward and rearward and exposes an under seat storage compartment that includes first and second drawers 44A and 44B on opposite lateral sides that allow access to the storage compartment.

As seen in FIG. 1, a first drawer 44A may be pulled laterally outward such that it slides out on a first lateral side when the corresponding door 16 of the vehicle 10 is open to expose the door opening 15. In this position, a user 90 may access a storage compartment within the first drawer 44A. In addition, a user 90 may utilize a step surface 50A provided on the first drawer 44A when the drawer is in an open step position. As seen in FIG. 1, the user 90 may step upon the step surface 50A to an elevated position to allow for elevated access of items such as those on the roof 20 of the motor vehicle 10, which, in one example, shows the user 90 accessing a rooftop carrier accessory 22.

Referring to FIGS. 2-11, the vehicle seating assembly 30 is illustrated as a bench or split bench seating assembly having a seat 32 and a seat back 34, supported on a support structure 38. The vehicle seating assembly 30 is shown as a second row seating assembly in a pickup truck. The support structure 38 has side walls and also forms an under seat storage assembly 40. The support structure 38, in turn, is supported on top of and above the vehicle floor 18, which, in an electric vehicle, may include a surface on top of or above the vehicle battery packs 26 that supply electric power to one or more electric motors to power the motor vehicle 10.

Figure 2:
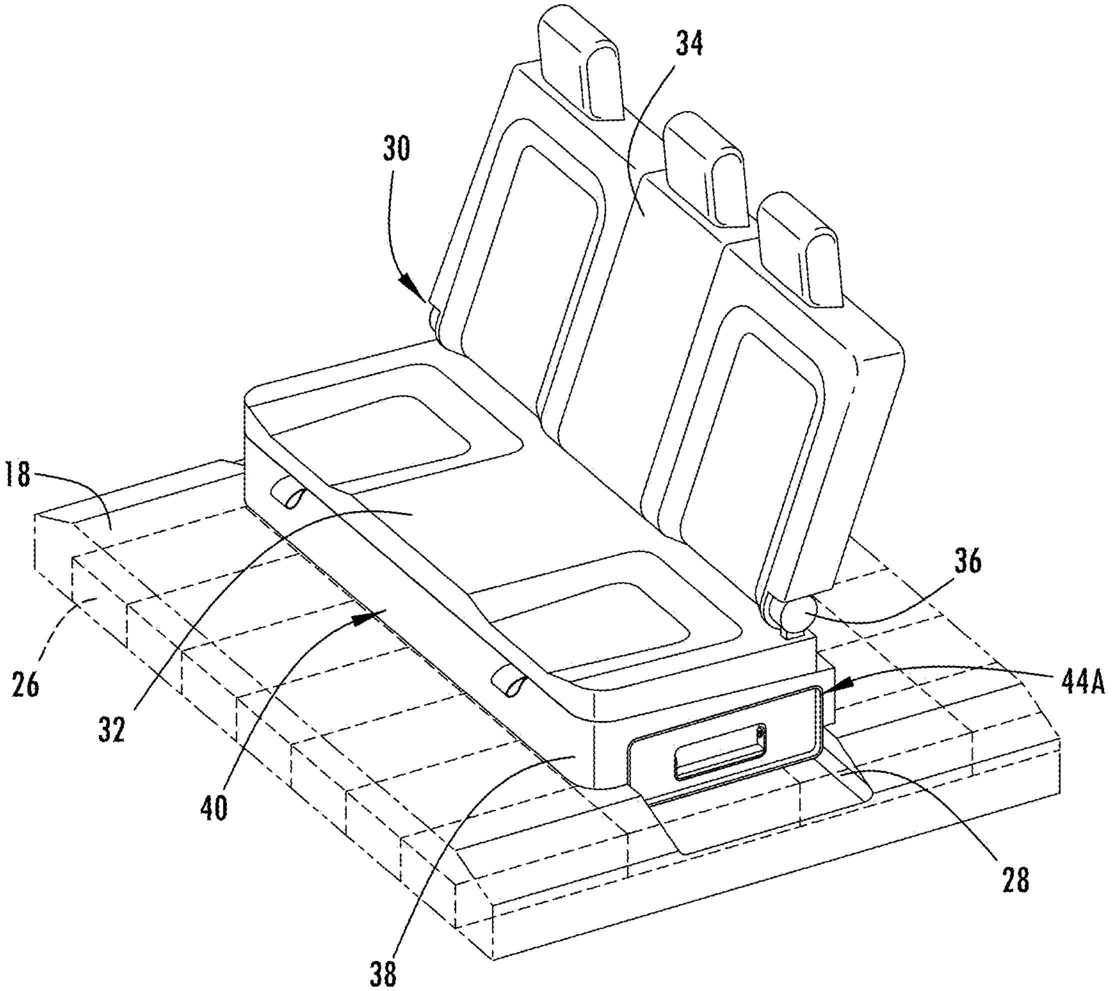
FIG. 2 is a perspective view of the vehicle seating assembly illustrating the seat assembly in a seating position and first and second drawers in a closed position.

The vehicle seating assembly 30 is shown in FIG. 2 with the seat 32 in the generally horizontal seating position and the first and second drawers 34A and 44B in a closed position. The seating assembly 30 is supported on an underlying floor 18 which may include the plurality of battery packs for an electric-powered vehicle, according to one example. It should be appreciated that an electric powered vehicle typically has a plurality of battery packs which may be placed in or forming the floor 18. Formed within the floor 18 and within the battery packs 26 is a recessed slot 28 which extends laterally and generally contains a lower portion of each of the first and second drawers 44A and 44B. As such, the first and second drawers 44A and 44B may slide laterally outward within the slot 28 which is a recessed area formed in the floor 18 of battery packs 26. In addition, the vehicle seating assembly 30 has a pivot mechanism 36 that allows the seat 32 to pivot between the seating position shown in FIG. 2 and the upright storage access position shown in FIG. 3 which uncovers and exposes the under storage compartment.

Figure 3:
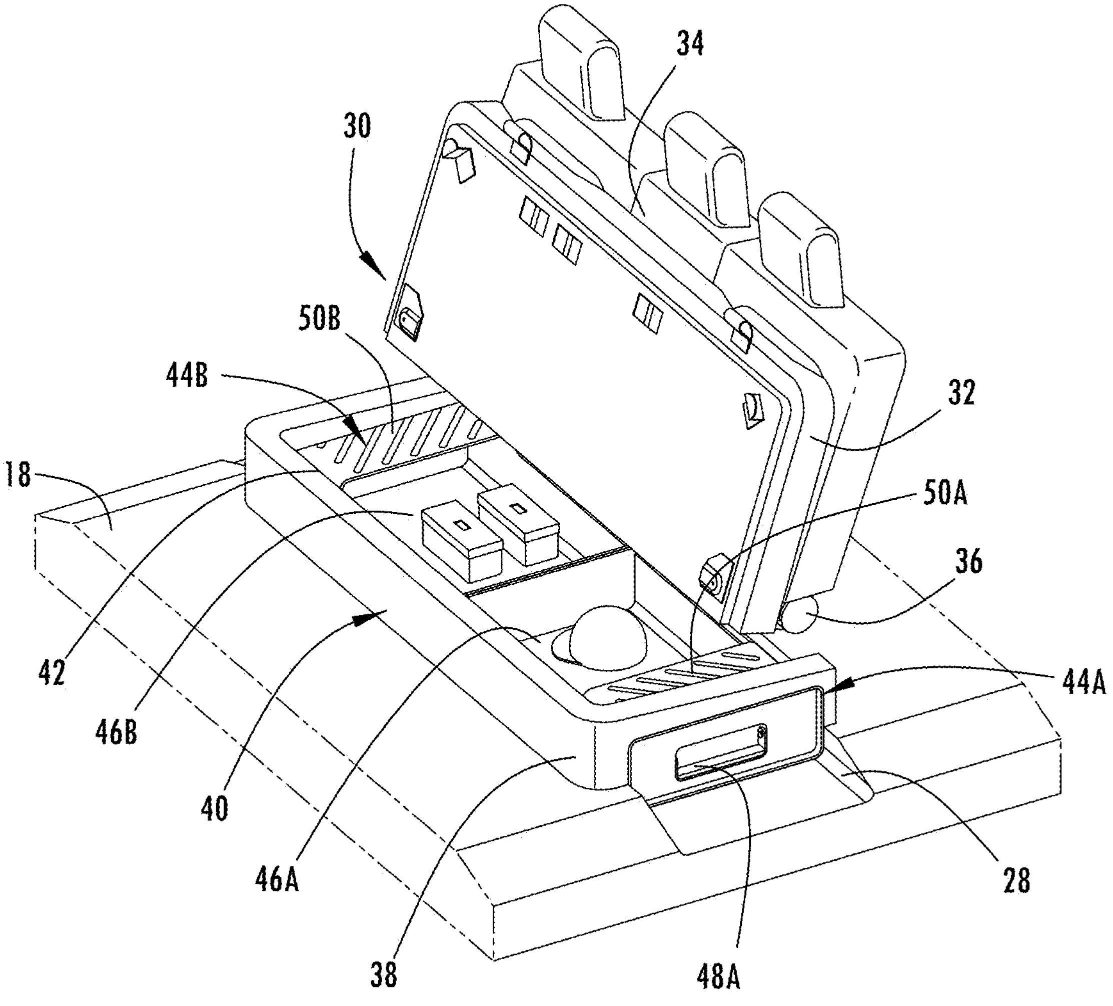
FIG. 3 is a front perspective view of the vehicle seating assembly further illustrating the seat in a folded upright position exposing a storage compartment under the seat.

In the upright storage position as seen in FIG. 3, the vehicle seating assembly 30 is shown having first and second storage compartments 46A and 46B. The first storage compartment 46A is generally defined by the interior portion of the first drawer 44A. Similarly, the second storage compartment 46B is generally defined by the opening portion of the second drawer 44B. Each of the first and second drawers 44A and 44B has a plurality of sidewalls that define the respective first and second storage compartments 46A and 46B. In addition, each of the first and second drawers 44A and 44B has a step surface 50A or 50B provided on a top laterally outward portion of the first and second drawers 44A and 44B.

Figure 4:
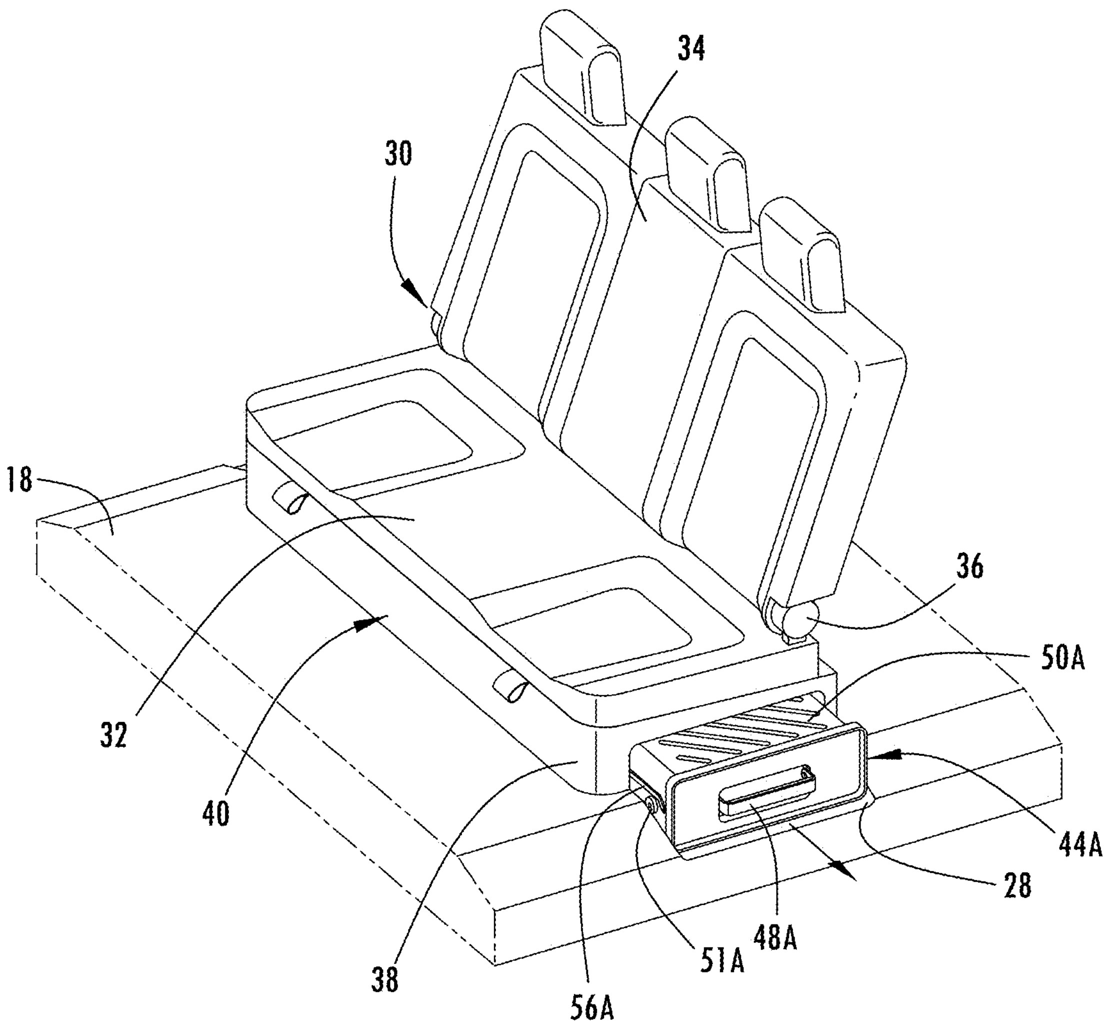
FIG. 4 is a front perspective view of the vehicle seating assembly further illustrating the first drawer of the storage compartment in a partially open position.

As seen in FIG. 4, the first drawer 44A is moved to a partially open position to at least partially expose the top step surface 50A. Movement of the first drawer 44A from the closed position to at least the first partially open position is achieved by pulling on the handle 48A to disengage a locking mechanism 56A to allow the drawer to move laterally outward with an applied force pulling on the handle 48A. It should be appreciated that the second drawer 44B, likewise, has a step surface 50A and may be moved laterally outward with an applied force when a handle 48B releases a locking mechanism 56B.

Figure 5:
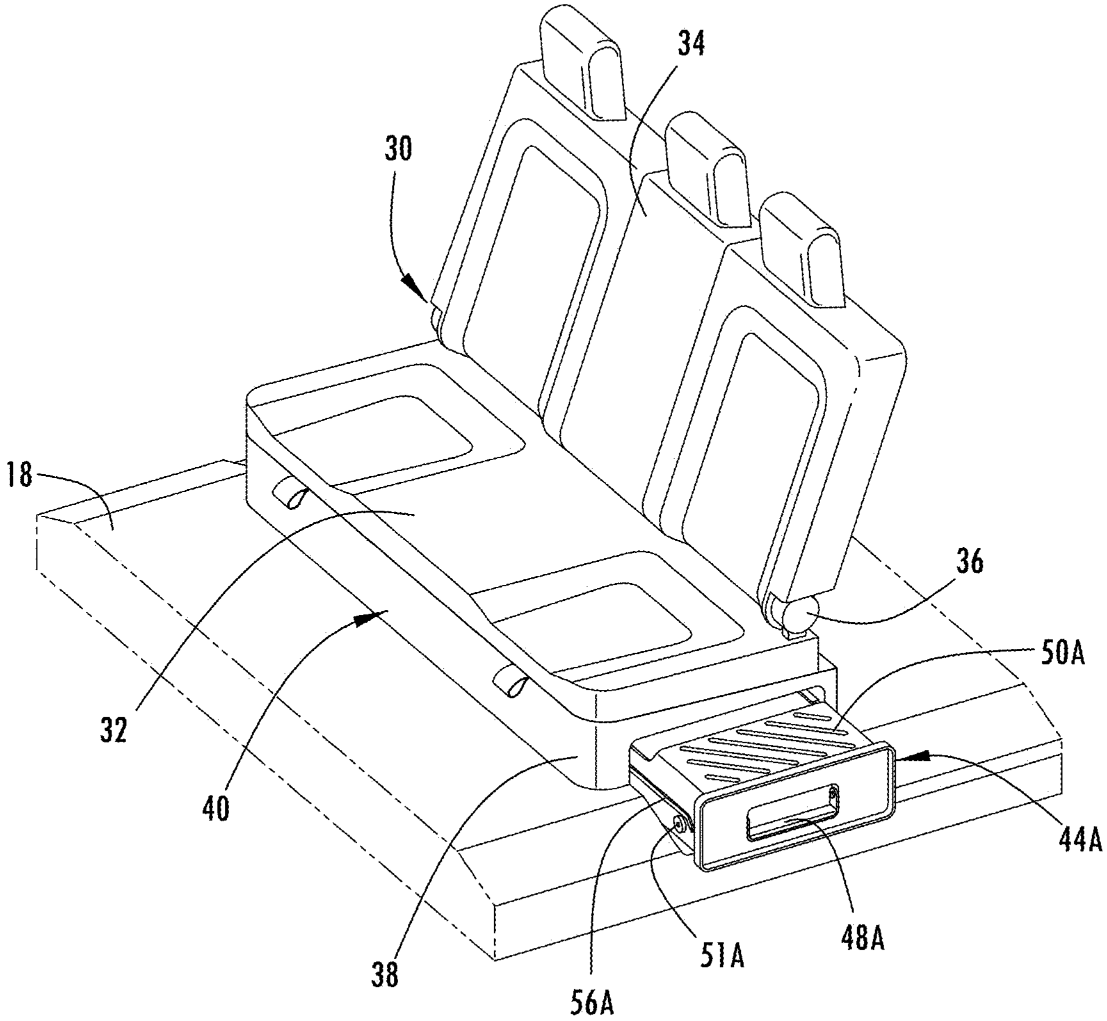
FIG. 5 is a front perspective view of the vehicle seating assembly showing the first drawer in a further partially open position defining the step position.

Referring to FIG. 5, the first drawer 44A is shown being moved further outwards to a step position in which the first drawer 44A is partially open and the step surface 50A is fully exposed on the outer top side. In this position, the locking mechanism 56A may engage one or more locking slots 80A in one or more rails to maintain and lock the first drawer 44A fixedly in the step position. The step surface 50A may be provided by a platform extending across an outer top portion of the first drawer 44A. In the step position, a user 90 may step on top of the step surface 50A to increase the reach height to enable the user 90 to reach one or more objects on or near the roof 20 of the motor vehicle 10, for example. It should be appreciated that the first drawer 44A is movable to the step position or any open position when a door 16 of the motor vehicle 10 proximate to the first drawer 44A is in the open position to allow for the outward lateral movement which extends outwards from the body of the vehicle 10. It should be further appreciated that the second drawer 44B may be, likewise, moved to a step position to enable a user 90 to step on the step surface 50B on the opposite lateral side of the motor vehicle 10.

Figure 6:
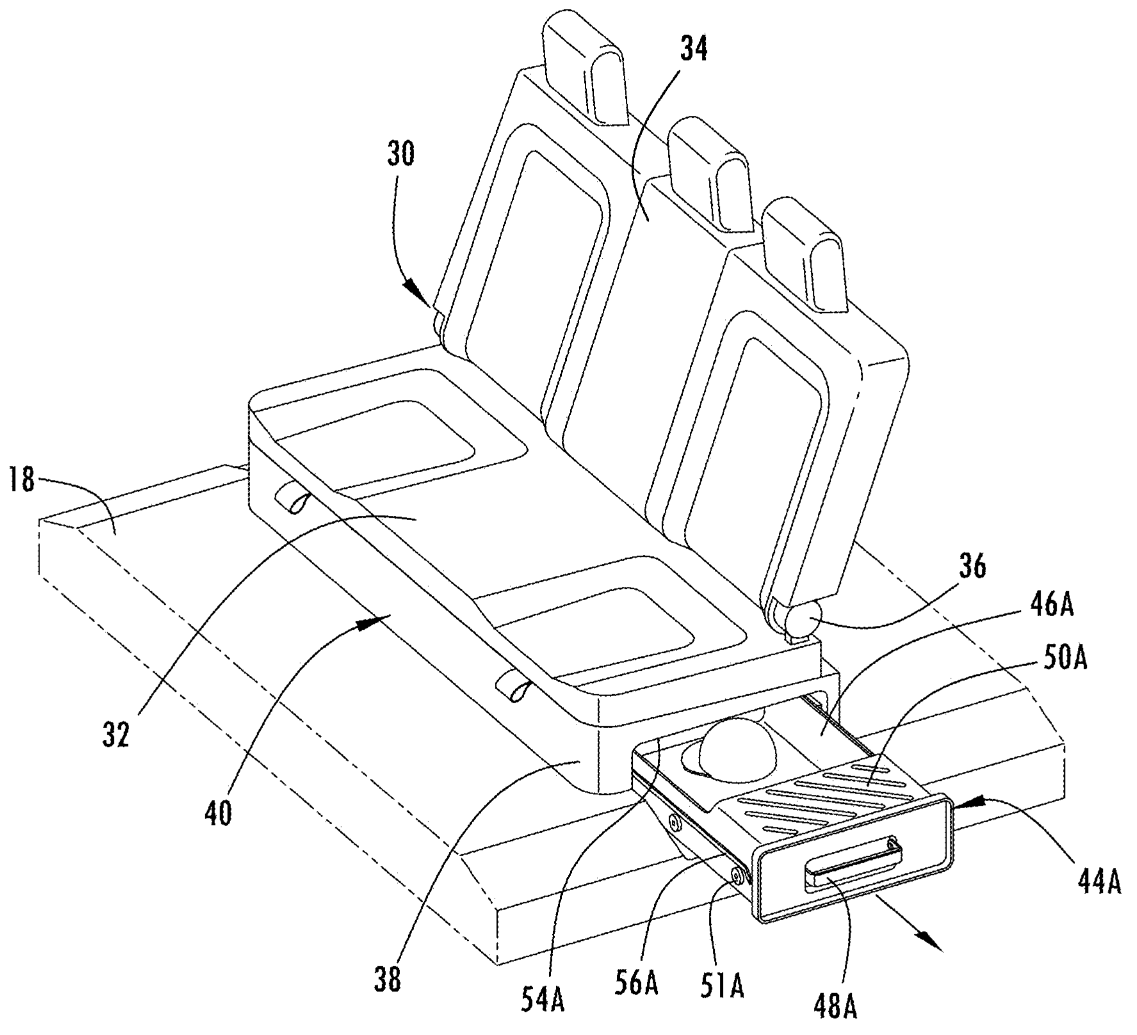
FIG. 6 is a front perspective view of the vehicle seating assembly further illustrating the first drawer in yet a further open position.

Referring to FIG. 6, the first drawer 44A is shown further moved laterally outward to a further open position which further uncovers and exposes the first compartment 46A. In this open position, a user 90 may have access to the first storage compartment 46A.

Figure 7:
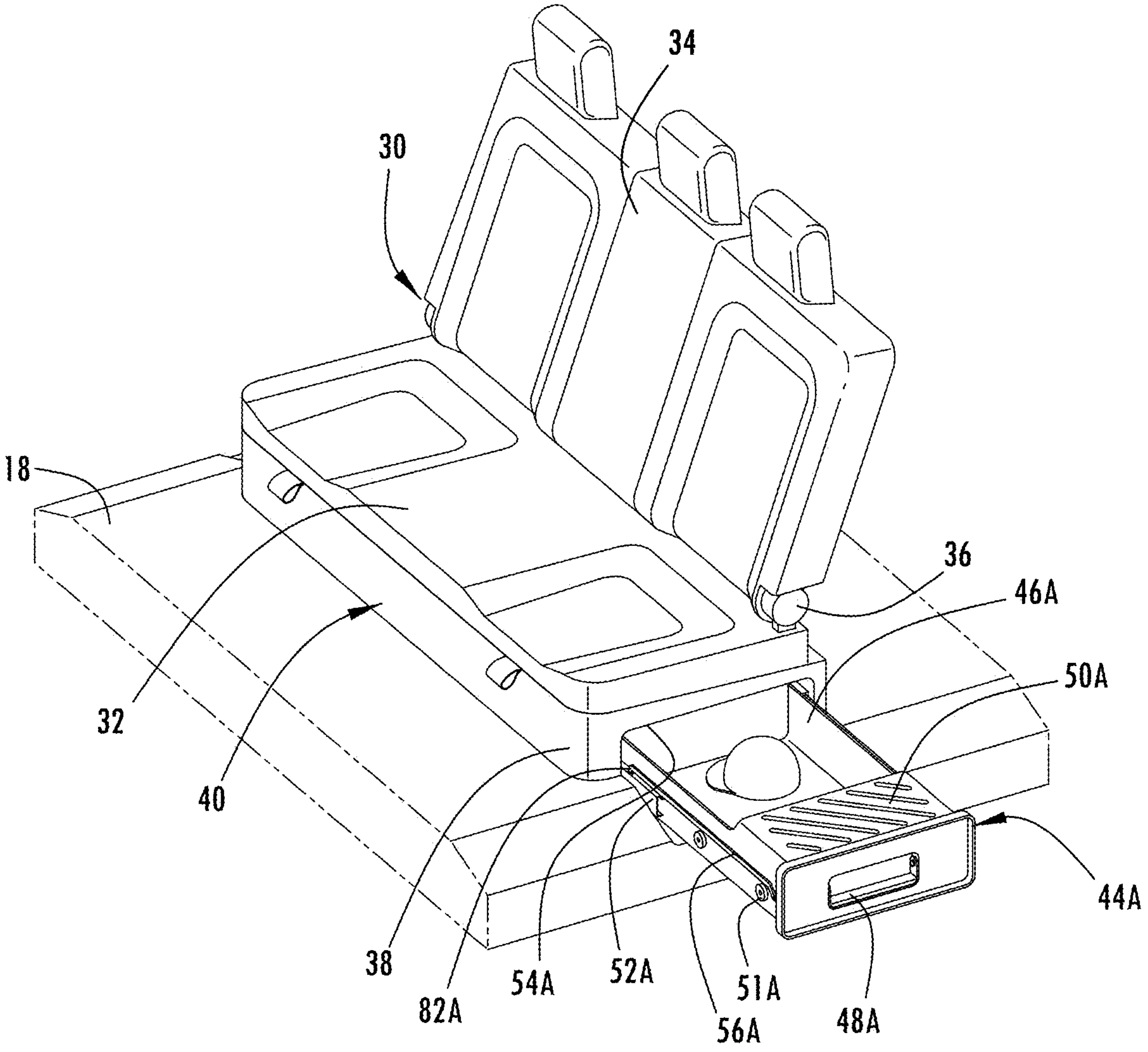
FIG. 7 is a front perspective view of the vehicle seating assembly further illustrating the first drawer in the fully open position.

Referring to FIG. 7, the first drawer 44A is further moved laterally outward to a fully open position. In the further fully open position, the user 90 has greater access to the storage compartment 46A. It should be appreciated that the user 90 may remove the first drawer 44A from the vehicle seating assembly 30 by further extending the first drawer 44A laterally outward from this position.

Figure 8:
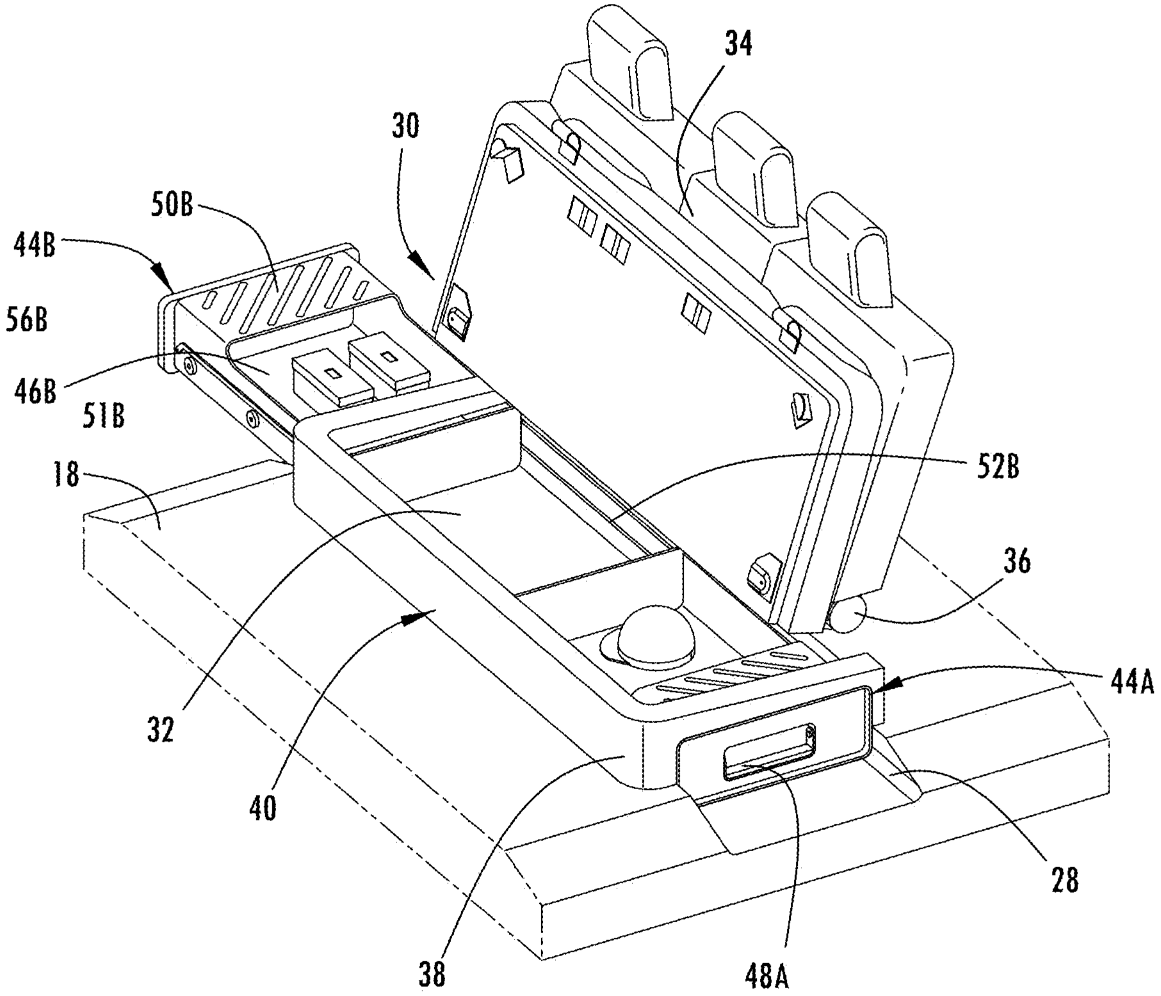
FIG. 8 is a front perspective view of the vehicle seat assembly with the seat flipped upward and the second drawer in an open position.

Referring to FIG. 8, the second drawer 44B is shown moved to a fully open position, similar to drawer 44A in FIG. 7. In this position, the second compartment is uncovered and exposed for access. It should be appreciated that the second drawer 44B may be moved to the same positions as shown for the first drawer 44A including the step position to allow a user 90 to step on the step surface 50B which may, likewise, be provided by a platform extending across an outer top portion of the second drawer 44B.

Figure 9:
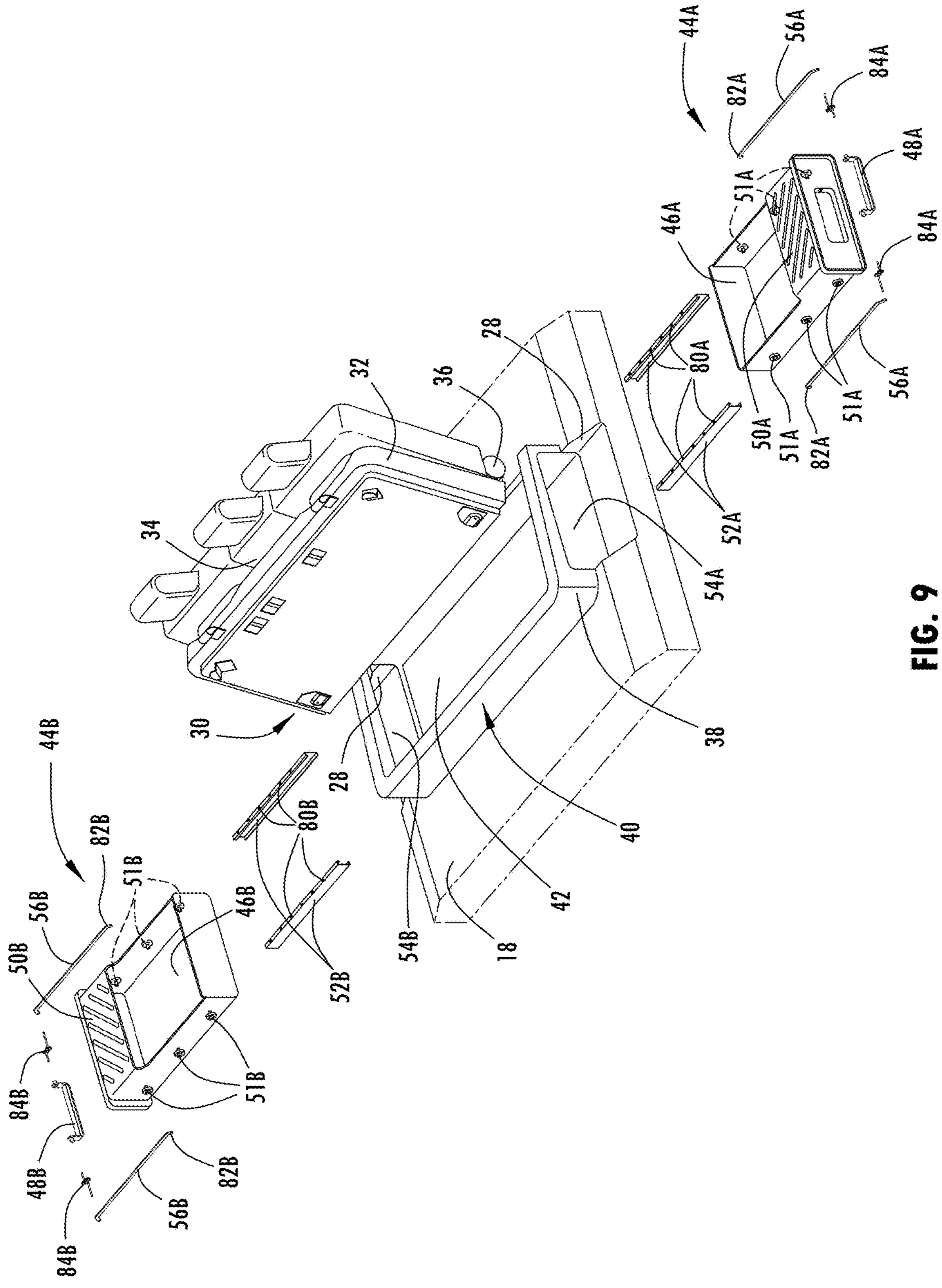
FIG. 9 is an exploded view of the seat assembly illustrating the first and second drawers with step portions.

Referring to FIG. 9, the vehicle seating assembly 30 is illustrated in greater detail showing the support structure 40 having first and second open lateral ends 54A and 54B configured to receive the respective first drawer 44A and second drawer 44B. In addition, a pair of rails 52A is provided on opposite vehicle forward and rearward sides of the support structure 40 near the first opening 54A. The rails 52A are configured to engage roller bearings 51A on opposite lateral sides of the first drawer 44A. As such, the roller bearings 51A enable the first drawer 44A to slide between the closed and open positions on rails 52A. In addition, each of the pair of rails 52A have a series of slots 80A formed on the bottom inwardly extending wall. The locking mechanism 56A includes an arm which extends to a curved locking portion 82A which is sized to engage one of the slots 80A in a locked position. When the handle 48A is lifted to a lock release position, it should be appreciated that the locking mechanism 56A advantageously may lock the first drawer 44A in a fixedly latched position when the first drawer 44A is in the step position to provide a stable step surface to step upon and prevent motion of the first drawer 44A.

The second drawer 44B, similar to the first drawer 44A, is inserted within the second opening 54A of the support structure 40 and includes a pair of rails 52B on opposite lateral sides. Each of the rails 52B, likewise, has a series of locking slots 80B formed on a bottom wall that may be engaged by the locking end 82B of the locking mechanisms 56B in response to actuation of the handle 48B. As such, the second drawer 44B may be locked in the step position to prevent movement of the drawer 44B when the user steps upon the step surface 50B.

Figure 10:
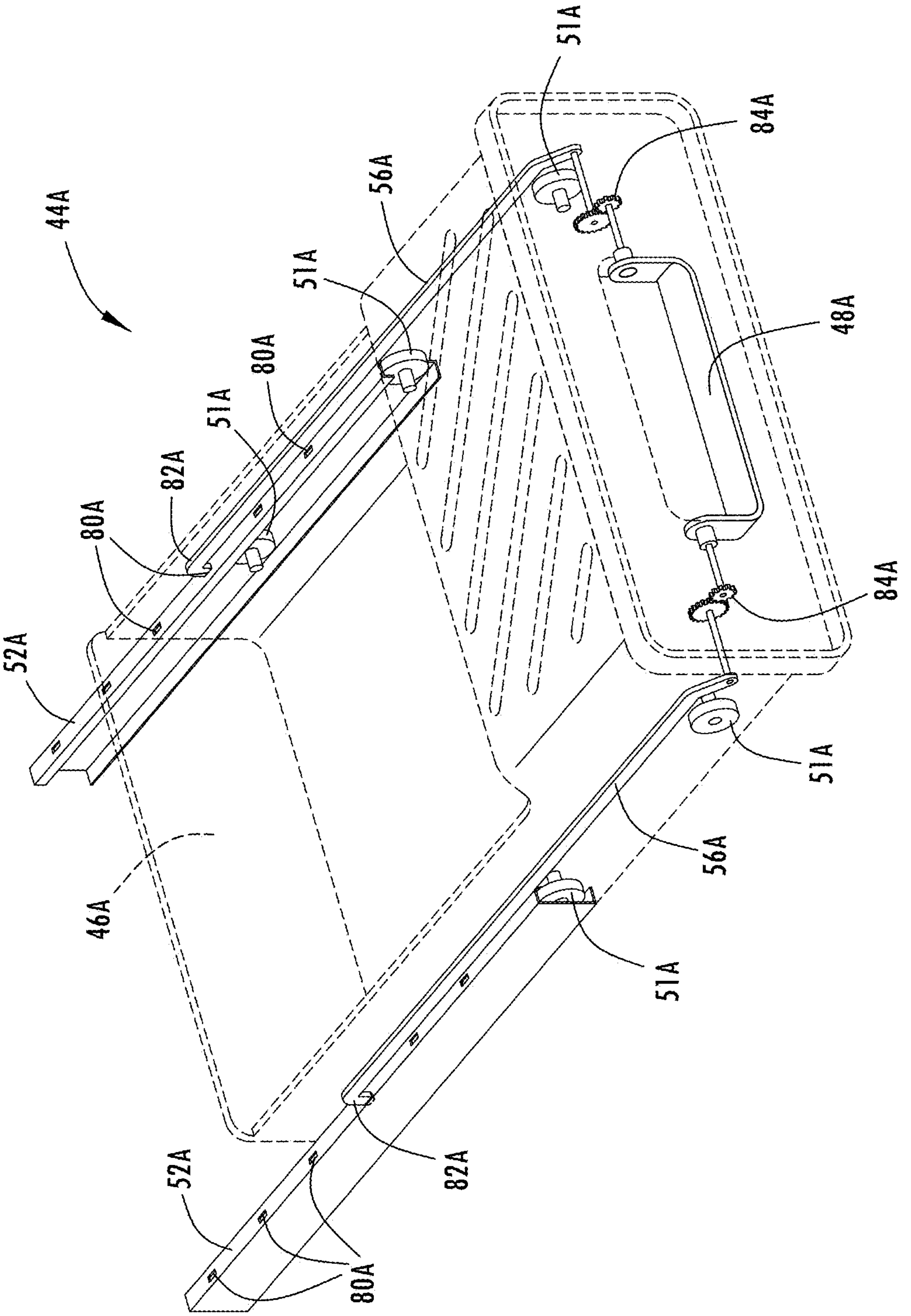
FIG. 10 is an upper perspective view of the first drawer with the handle in a locked position.

Referring to FIG. 10, the handle 48A of the first drawer 44A is shown in a locked position where the locking mechanism 56A extends downward such that the engaging end 82A engages one of the locking slots 80A in the rails 52A. When a user pulls on the handle 48A to extend the handle 48A laterally outward, the locking mechanism 56A is rotated upward to release the locking ends 82A from the locking slot 80 to allow the first drawer 44A to move between the closed and open positions. The locking mechanism 56A is operatively coupled to the handle 48A via a transmission coupling which may include a pair of mated gears 84B, for example. The handle 48A may include a pair of springs, such as torsion springs, that bias the handle 48A to the downward locked position. As such, when a user releases the handle 48A, the handle 48A is spring-biased to return to the locked position.

Figure 11:
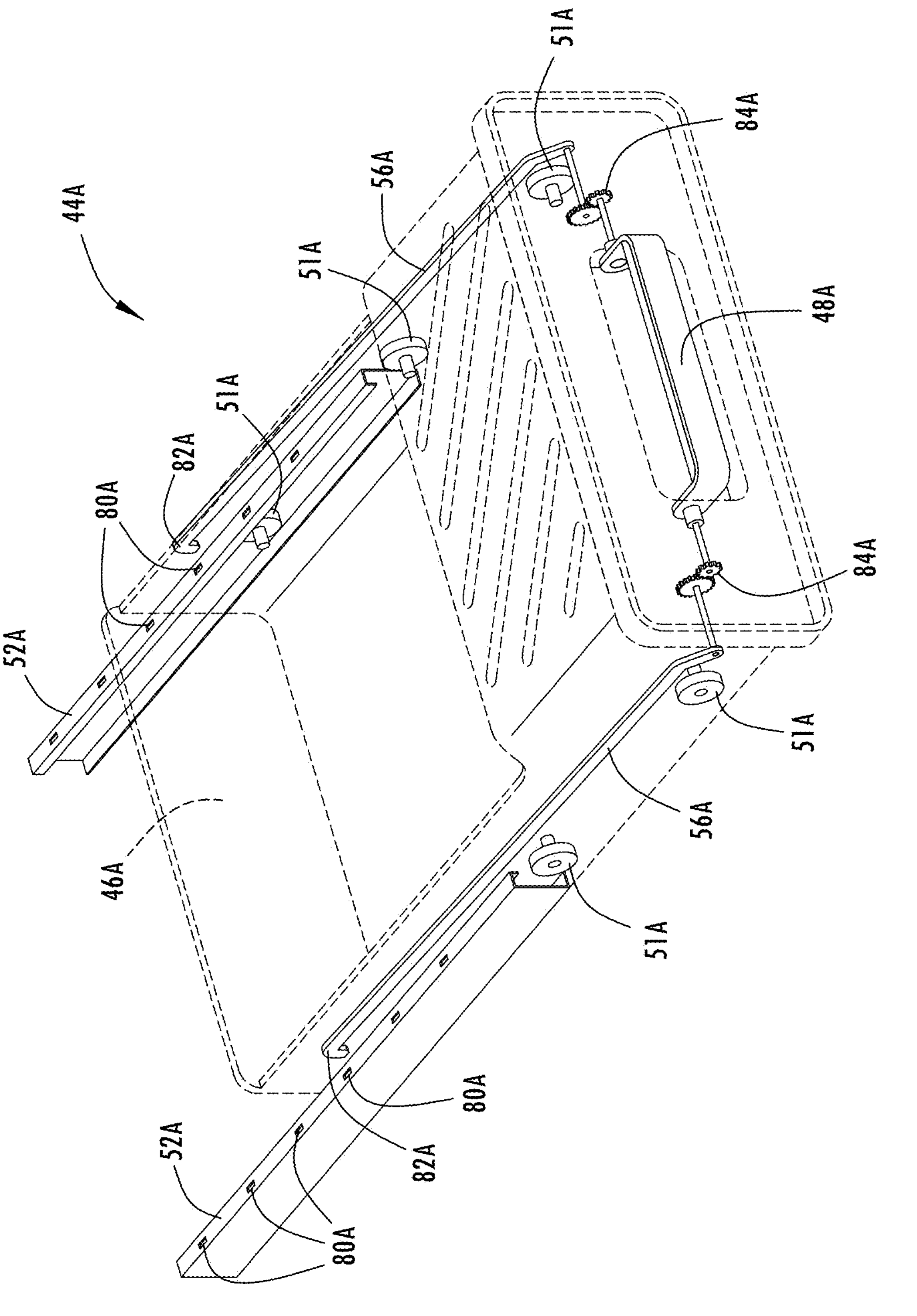
FIG. 11 is an upper perspective view of the first drawer showing the handle in an unlocked position.

Referring to FIG. 11, the first drawer 44A is shown with the handle 48A in the unlocked position. In this position, the locking mechanism 56A is raised such that the locking ends 82A disengage the locking slots 80A on the rails 52A. In this position, the first drawer 44A may slide between the closed and open positions. It should be appreciated that the second drawer 44B is configured similar to the first drawer 44A with a locking mechanism operatively coupled to a transmission coupling and spring arrangement.

Accordingly, the vehicle seating assembly 30 advantageously provides for an under seat storage compartment having one or more drawers 44A and 44B with a step surface to enable a user to reach elevated portions of the motor vehicle 10, such as the roof of the vehicle or articles attached to the roof of the vehicle. The step surface 50A is advantageously built into the drawer such that added parts are not needed. It should be appreciated that the subject matter of this disclosure would only be used while the vehicle is stationary and in park.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly for use in a cabin interior of a vehicle, the vehicle seating assembly comprising:

a seat back;

a seat that is pivotable between a raised position and a lowered seating position;

a storage compartment located under the seat when the seat is in the lowered seating position; and a first drawer slidably disposed within the storage compartment under the seat and accessible via a first lateral side of the vehicle seating assembly, wherein the first drawer defines a first storage compartment and includes a first step surface on a top side thereof configured to support a user when the first drawer is moved laterally outward from the first lateral side of the vehicle seating assembly to an open step position, wherein the first storage compartment is accessible in the open step position and the step surface at least partially covers the first storage compartment and extends under the seat when the first drawer is in a closed position.

2. The vehicle seating assembly of claim 1, wherein the storage compartment comprises a seat support for supporting the seat and seat back.

3. The vehicle seating assembly of claim 2, wherein the seat support is configured to be supported on top of a vehicle floor.

4. The vehicle seating assembly of claim 3, wherein the first drawer is disposed within a recessed portion of the floor.

5. The vehicle seating assembly of claim 4, wherein the vehicle floor comprises at least one battery pack.

6. The vehicle seating assembly of claim 1, wherein the first drawer is located on the first lateral side and the seating assembly further comprises a second drawer located on a second lateral side, wherein the second drawer includes a second step surface configured to support a user when the second drawer is in an open step position.

7. The vehicle seating assembly of claim 1, wherein the first drawer comprises first and second rails configurated to engage a plurality of rollers.

8. The vehicle seating assembly of claim 7, wherein the first drawer comprises a lock mechanism that prevents movement of the first drawer in the open step position.

9. The vehicle seating assembly of claim 8, wherein the lock mechanism engages slots in the pair of rails in a locked position.

10. The vehicle seating assembly of claim 1, wherein the vehicle seating assembly is a second row seating assembly in a pick-up truck.

11. A vehicle comprising:

a body having a cabin interior and a side door;

a floor defining a bottom side of the cabin interior; and a vehicle seating assembly having a first lateral side proximate the side door and comprising:

a seat back;

a seat that is pivotable between a raised position and a lowered seating position;

a storage compartment located under the seat when the seat is in the lowered seating position; and a first drawer slidably disposed within the storage compartment and accessible via the first lateral side of the vehicle seating assembly, wherein the first drawer is configured to extend outward from the first lateral side to an open drawer position when the side door is in an open door position and the first drawer defines a first storage compartment and includes a first step surface on a top side thereof configured to support a user when the drawer is in an open drawer step position, wherein the first storage compartment is accessible in the open step position and the step surface at least partially covers the first storage compartment and extends under the seat when the first drawer is in a closed position.

12. The vehicle of claim 11, wherein the storage compartment comprises a seat support for supporting the seat and seat back.

13. The vehicle of claim 12, wherein the seat support is configured to be supported on top of the floor.

14. The vehicle of claim 13, wherein the first drawer is disposed within a recessed portion of the floor.

15. The vehicle of claim 14, wherein the vehicle floor comprises at least one battery pack.

16. The vehicle of claim 11, wherein the first drawer is located on the first lateral side and further comprising a second drawer located on a second lateral side, wherein the second drawer includes a second step surface configured to support a user when the second drawer is in an open drawer position.

17. The vehicle of claim 11, wherein the first drawer comprises a pair of rails configured to engage a plurality of rollers.

18. The vehicle of claim 17, wherein the first drawer comprises a lock mechanism that prevents movement of the first drawer in the open drawer step position.

19. The vehicle of claim 18, wherein the lock mechanism engages slots in the pair of rails in a locked position.

20. The vehicle of claim 11, wherein the vehicle seating assembly is a second row seating assembly in a pick-up truck.

* * * * *